Dec. 28, 1954  R. M. RINGOEN  2,698,433
VISUAL DISPLAY FOR RADIOMETRIC RECEIVERS
Filed Dec. 7, 1951  2 Sheets-Sheet 2

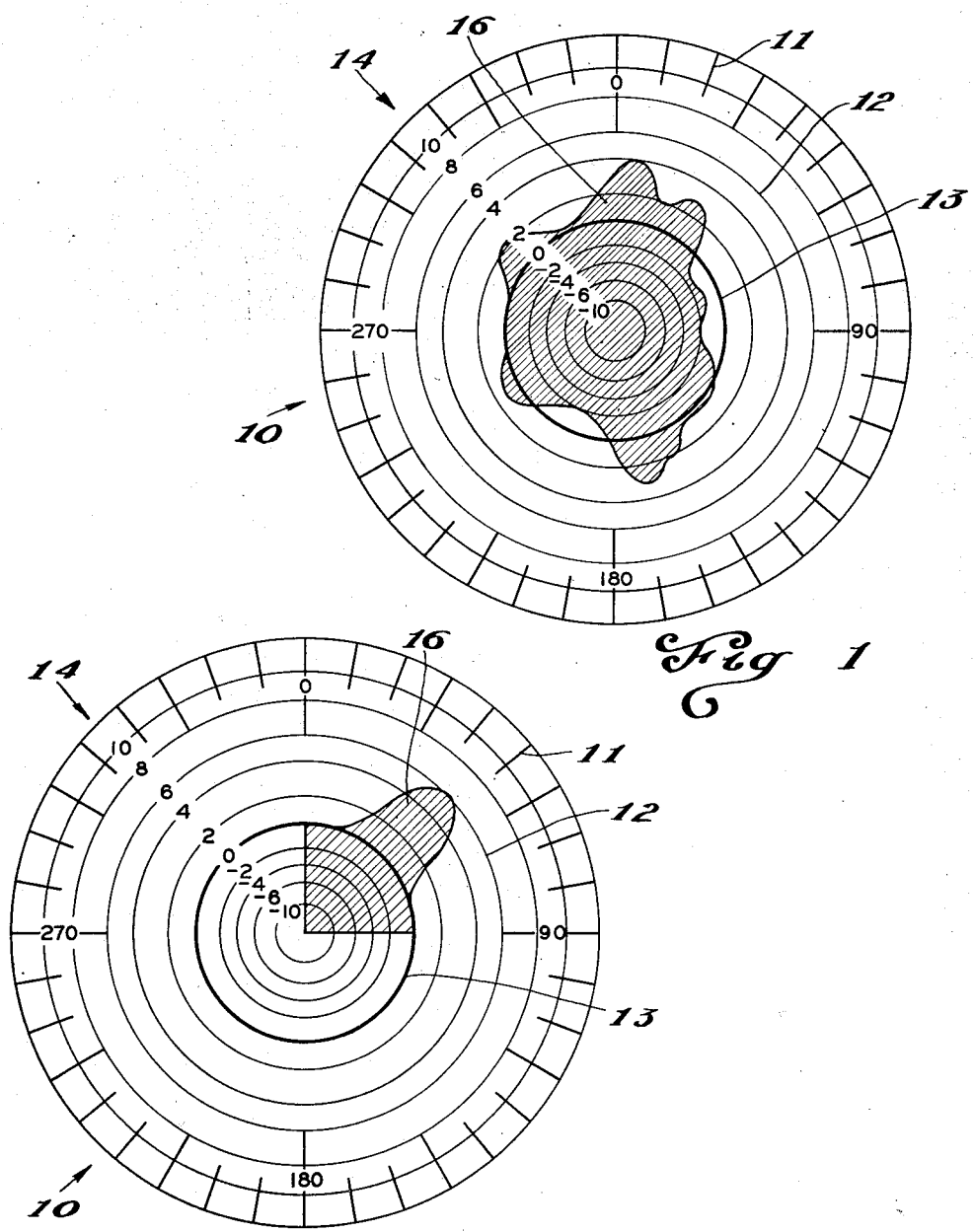

INVENTOR.
RICHARD M. RINGOEN
BY
ATTORNEY

United States Patent Office 2,698,433
Patented Dec. 28, 1954

2,698,433

VISUAL DISPLAY FOR RADIOMETRIC RECEIVERS

Richard M. Ringoen, Cedar Rapids, Iowa, assignor to Collins Radio Company, Cedar Rapids, Iowa, a corporation of Iowa Application December 7, 1951, Serial No. 260,441

4 Claims. (Cl. 343—118)

This invention relates in general to presentation means for a radiometric receiver.

The conventional P. P. I. radar screen presents range, amplitude, and azimuth data. However, in radiometric receivers no range information is directly available. Radiometric receivers detect the energy given off by the target rather than a reflection or echo from the target. For a detailed description of a radiometric receiver reference may be made to the patent to Southworth, Number 2,458,654. Since range is not available from a radiometric receiver, the type of presentation of the received information must vary from the P. P. I. presentation.

The present invention relates to a means for displaying the output of a radiometric receiver by utilizing the output amplitude of the receiver and the azimuthal antenna position.

It is an object of this invention to provide a presentation system wherein a standard radial amplitude represents a mean signal which increases and decreases in amplitude in response to increase and decrease in the receiver's output.

Further advantages, objects and features of this invention will become apparent from the following description and claims when read in view of the drawings in which:

Figure 1 represents the end of a cathode ray tube showing the presentation of this invention;

Figure 2 illustrates the cathode ray tube presentation for a 90 degree sector search.

Figure 3:
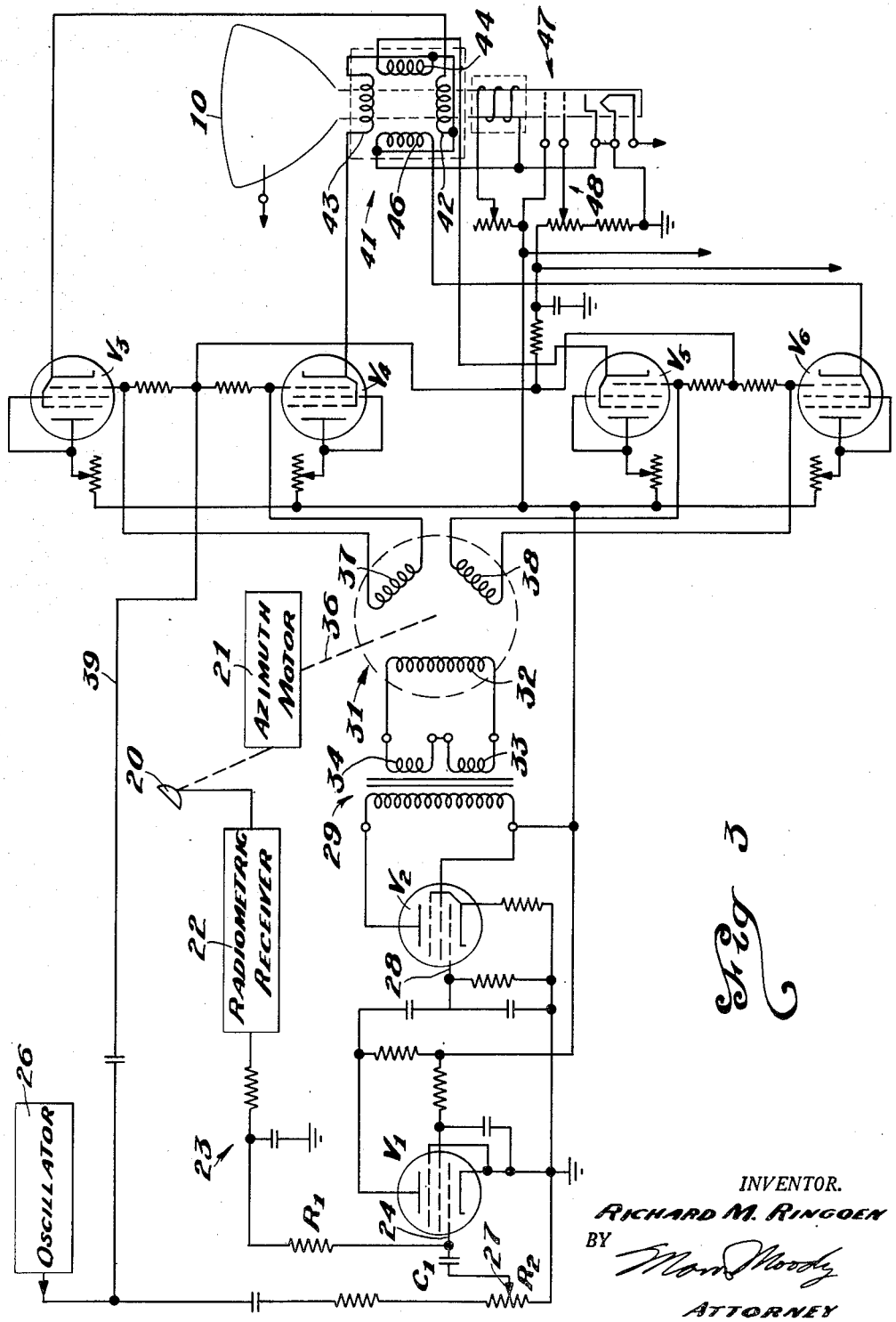
Figure 3 is a schematic diagram of the presentation circuit of the invention.

Figure 1 illustrates the end 10 of a cathode ray tube which has printed about its outer periphery a compass card which is indicated by the radial lines 11. A number of concentric lines 12 are formed about the center with a relatively heavier line 13 approximately one third of the distance from the center to the outer edge.

The line 13 is indicated as zero by the radially printed numbers 14. The numbers become progressively larger from the line 13 toward the edge and become smaller from the line 13 toward the center.

A trace 16 is illustrated and it is to be understood that this trace presents the received energy versus azimuth relationship. The line 13 represents an energy level when no output is received from the radiometric receiver. When an output from the receiver is present and its polarity indicates that the antenna temperature is higher than the reference temperature, the length of the radial line will be increased beyond the reference circle.

If the output signal is of opposite polarity, indicating that the antenna temperature is below the reference temperature, the length of the radial line will be decreased from its reference length. As the antenna is rotated in azimuth, the radial line swept out by the spot will move in accordance with the position of the antenna in azimuth. Hence both antenna temperature and azimuth angle of the antenna are presented.

It is known that all bodies or objects which have a temperature warmer than absolute zero radiate energy due to the thermal activity of the molecules. If the object is colder than its surrounding environment, it may absorb more energy than it gives off, but nevertheless, it is giving off some energy at the same time. Thus, if an object is placed in a constant temperature chamber and left for a relatively long time, a state of equilibrium will be reached where the energy given off is equal to the energy received and the temperature will remain constant. This invention detects the energy radiated from the radiating body. Whereas, generally to locate an object the echo from a transmitted wave must be detected, the system of the present invention requires no transmitter whatsoever. This is quite an advantage in military uses in that the location of the equipment cannot be ascertained by receiving the transmitted wave.

This invention has been used to track the sun and the moon and thus is useful when the optical sextant may not be used because clouds hide them. Sufficient energy passes through the clouds to operate the applicant's system. The antenna temperature varies with the amount of energy being received from a radiating body. If a particular radiating body is chosen as a reference for calibrating purposes, as for example, a structure of known radiation, it may be used as a reference temperature and if more energy is received from a body with unknown energy output than is received from the reference body, an output greater than the reference signal will be received. The term atmospheric temperature relates to the temperature seen by the antenna when pointed into the atmosphere, rather than at a particular solid body.

A display of this type is very valuable when used in making atmospheric and celestial studies, for instance, a radiometer may be used to measure atmospheric absorption at a given wavelength. The magnitude of the absorption seen by the radiometer at any one wavelength is a function of the pointing of the antenna beam. The uneven distribution of water vapor, oxygen, etc. in the atmosphere will cause the absorption to vary as the antenna is rotated in azimuth at a constant elevation angle. The study of this atmospheric "lumpiness" may be facilitated by employing the display under discussion. For example, Figure 1 might well be the type of picture which would result from rotating the antenna 360 degrees in azimuth at a constant elevation angle. Photographic records of such atmospheric temperature versus azimuth data could be helpful in determining prevailing weather conditions.

Radiometers may be used to study radiation from various celestial bodies in much the same way as an astronomical telescope is used. A presentation such as shown in Figure 2 will be very helpful in this type of work. In this case the antenna is rotated to search a 90 degree sector.

Figure 3 illustrates the circuitory required for the presentation. An antenna 20 is mounted on an alt-azimuth mount and is driven in azimuth by an azimuth motor 21. A radiometric receiver 22 receives the output of the antenna 20 and after detection passes it through a filter network 23 to change it to a D. C. signal. The filter network integrates the signal to obtain a smoothly varying output.

A tube $V_1$ has its control grid 24 connected to the filter 23 through the resistor $R_1$. The tube $V_1$ might be a type 6AC7, for example. An oscillator 26 produces an output which might be 500 cycles, for example, which is connected to a resistor $R_2$ and is connected to a coupling condenser $C_1$ that has its opposite side connected to the grid 24.

The purpose of the oscillator 26 is to produce a radial sweep from the center of the cathode ray tube to the correct amplitude. The A. C. output of tube $V_1$ is coupled to the control grid 28 of an amplifier tube $V_2$, which might be a 6AQ5. The output of tube $V_2$ is connected to the primary of an impedance matching transformer 29. A resolver designated generally as 31 has its rotor 32 coupled to the secondaries 33 and 34, respectively, of the transformer 29. The resolver is driven by the azimuth motor 21 through a shaft 36.

The resolver has two windings displayed 90 degrees apart, designated as 37 and 38, respectively.

Four driver tubes $V_3$, $V_4$, $V_5$ and $V_6$ have their control grids connected to opposite ends of the windings 37 and 38. The oscillator 26 furnishes an output to the tubes $V_3$, $V_4$, $V_5$ and $V_6$ through a lead 39. The cathodes of the tubes $V_3$, $V_4$, $V_5$ and $V_6$ are connected to different windings of a magnetic deflection yoke 41 mounted on cathode ray tube 10.

The tube $V_3$ is connected to a winding 42 which controls the vertical-down deflection and tube $V_4$ is connected to a winding 43 which controls the vertical-up deflection of the beam. The tube V5 is connected to a winding 44 which controls the horizontal-left deflection and the tube V6 is connected to a winding 46 which controls the horizontal-right deflection. The cathode ray tube 47 has a conventional electron gun with a focus control designated generally as 48.

The biases of the tube V3 through V6 are adjusted so that with zero input from the radiometric receiver 22 the trace of the beam will traverse about the circle 13. The variable contact 27 may be adjusted to control the zero position. When a signal is received from the receiver 22 on the control grid 24, the trace will be deflected either outwardly or inwardly depending on the polarity of the signal.

The driver stages for the cathode ray tube must operate in such a way to cause the sweep to emanate from the center of the tube and never to sweep past the center of the tube on the negative portion of the sweep signal. To accomplish this, the 28 volts 500-cycle output of the oscillator is placed in phase on the grids of the four tubes V3 through V6 driver stages. These tubes are normally biased beyond cut-off with no 500-cycle voltage present. Hence the output of the oscillator causes the plate currents of the four tubes to flow in the form of half sine wave pulses of equal amplitude. The effects of these currents cancel out in the four coils in the deflection yoke because they create an equal force driving the spot in the four quadrature directions. The operation of the driver tubes may best be understood by considering each pair of them separately. The output of one phase of the resolver is placed out of phase on the control grids of the two tubes driving the horizontal deflection coils. This signal mixes with the original 500-cycle placed on the control grids. The two signals will be either in phase or 180 degrees out of phase. Consequently the presence of an output voltage from the resolver will cause the plate current from one of the tubes to increase and the other to decrease. This yields a resultant magnetic field in the deflection yoke causing the spot to be swept out from the center in the horizontal plane. The signal from the oscillator will always be larger than the signal from the resolver so it will retain control on the negative portion of the sine wave and keep the tubes cut off regardless of the amplitude of the output from the resolver. This prevents the spot from being swept through the center of the tube in the opposite direction to the original sweep. The operation of the tubes driving the vertical deflection coils is identical to that just explained for the horizontal coils.

With a fixed amplitude output from the modulator, the sweep length must remain constant as the antenna is scanned in azimuth. This requires that the gain of the four driver tubes V3 through V6 must be identical. Otherwise, as the antenna is scanned a circle of bright area would not appear on the screen of the cathode ray tube. This dictates the operation of the tubes as cathode followers. However, 6AQ5's are fairly low mu tubes so that their gain in cathode follower type of operation is not entirely independent of the tubes themselves. Consequently, 250-ohm variable resistors are placed in the plate circuits of each set of driver tubes. These resistors may be adjusted to equalize the gains of each pair of tubes and hence yield constant amplitude sweep as the antenna is scanned. The cathode ray indicator is a 5-inch magnetic deflection type of tube employing four sets of coils spaced in quadrature around the yoke of the tube. The tube is focused by means of a focus coil as indicated in Figure 3. The orientation of the focus coil with respect to the tube is adjustable and this adjustment is used originally to center the spot.

Oscillator 26 gives A. C. output so that a radial line with length determined by D. C. from receiver is obtained.

Although this invention has been described with respect to a particular embodiment thereof, it is not to be so limited as changes and modifications may be made therein which are within the full intended scope of the invention as defined by the appended claims.

I claim:
1. Apparatus for displaying azimuth versus amplitude information from a radiometric receiver comprising, an antenna mounted on an alt-azimuth axis, an azimuth motor driving the antenna in azimuth a radiometric receiver receiving the output of said antenna, a filter receiving the output of said radiometric receiver to change it to a direct current, an oscillator, an amplifier tube receiving the output of said oscillator and the output of said filter on its control grid, a resolver with its rotor connected to the output of said amplifier tube driven by the azimuth motor and having a pair of stationary windings, and a cathode ray tube connected to the stationary windings of said resolver.

2. Presentation means for a radiometric receiver comprising, a cathode ray tube formed with a number of concentric lines printed on its face, an antenna, an azimuth motor driving said antenna in azimuth, a radiometric receiver receiving an input from said antenna, a filter receiving the output of said receiver and converting it to a direct current signal, an oscillator, an amplifier tube receiving inputs from the filter and the oscillator on its control grid, a resolver formed with a rotor and a pair of stator windings displaced 90 degrees from each other receiving the input from said amplifier on its rotor, said rotor driven by the azimuth motor, four deflection windings controlling the beam of the cathode ray tube, and said four deflection windings connected respectfully to opposite ends of said stator windings.

3. An amplitude versus azimuth presentation comprising, a cathode ray tube, an antenna, an azimuth motor driving said antenna in azimuth, a radiometric receiver receiving an input from said azimuth antenna, a filter receiving the output of said receiver and converting it to a direct current signal, an oscillator, an amplifier receiving inputs from said oscillator and said filter on its control grid, a resolver with its rotor driven by the azimuth motor, the rotor of said resolver coupled to the output of the amplifier tube, a pair of stator windings on said resolver displaced 90 degrees from each other, four driver tubes connected respectfully to opposite ends of the two stator windings, four deflection windings mounted to said cathode ray tube for controlling the deflection of the cathode ray beam, and the four deflector windings connected respectfully to the four deflector tubes.

4. Presentation means for a radiometric receiver comprising, a cathode ray tube formed with a plurality of concentric lines about its face, an antenna mounted on alt-azimuth axis, an azimuth motor driving said antenna, a radiometric receiver receiving an output from said antenna, a filter receiving the output of said radiometric receiver and converting it to a direct current, an oscillator, an amplifier tube receiving the outputs of said filter and said oscillator on its control grid, a resolver driven by the azimuth motor, the rotor of said resolver coupled to the output of the mixer tube, a pair of stator windings on said resolver displaced 90 degrees from each other, and deflection means connected to the stator windings to vary the position of the cathode ray beam.

References Cited in the file of this patent

UNITED STATES PATENTS

| Number | Name | Date |
|---|---|---|
| 2,399,017 | Goldman | Apr. 23, 1946 |
| 2,403,967 | Busignies | July 16, 1946 |
| 2,422,697 | Meacham | June 24, 1947 |
| 2,437,286 | Witt | Mar. 9, 1948 |
| 2,512,703 | Wilkerson | June 27, 1950 |
| 2,571,051 | Mizen | Oct. 9, 1951 |
| 2,589,216 | Ayres | Mar. 18, 1952 |
| 2,590,114 | McVay | Mar. 25, 1952 |
| 2,625,678 | Allison | Jan. 13, 1953 |